(12) United States Patent
Kaneko et al.

(10) Patent No.: US 11,874,290 B2
(45) Date of Patent: Jan. 16, 2024

(54) SAMPLE PRETREATMENT DEVICE

(71) Applicant: SHIMADZU CORPORATION, Kyoto (JP)

(72) Inventors: Naoki Kaneko, Kyoto (JP); Ritsuko Yoda, Kyoto (JP); Akihito Korenaga, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 75 days.

(21) Appl. No.: 17/518,003

(22) Filed: Nov. 3, 2021

(65) Prior Publication Data

US 2022/0187332 A1    Jun. 16, 2022

(30) Foreign Application Priority Data

Dec. 15, 2020 (JP) ................................. 2020-207480

(51) Int. Cl.
| | |
|---|---|
| *G01N 35/10* | (2006.01) |
| *H01J 49/16* | (2006.01) |
| *G01N 35/00* | (2006.01) |

(52) U.S. Cl.
CPC ..... *G01N 35/1002* (2013.01); *G01N 35/0099* (2013.01); *G01N 35/1009* (2013.01); *H01J 49/164* (2013.01)

(58) Field of Classification Search
None
See application file for complete search history.

(56) References Cited

U.S. PATENT DOCUMENTS

| | | | |
|---|---|---|---|
| 2003/0069699 A1* | 4/2003 | Ekins ................. | G01N 33/5076 702/19 |
| 2004/0096365 A1* | 5/2004 | Toi ..................... | G01N 35/1011 422/502 |
| 2009/0117620 A1* | 5/2009 | Fritchie ................ | B01L 3/5085 422/68.1 |

OTHER PUBLICATIONS

Naoki Kaneko et al., "Novel plasma biomarker surrogating cerebral amyloid deposition", Proc. Jpn. Acad., Ser. B, Phys. Biol. Sci., 2014, pp. 353-364, vol. 90, No. 9.
Akinori Nakamura et al., "High performance plasma amyloid-β biomarkers for Alzheimer's disease", Nature, 2018, pp. 249-254, vol. 554, No. 7691.

* cited by examiner

*Primary Examiner* — P. Kathryn Wright
(74) *Attorney, Agent, or Firm* — Sughrue Mion, PLLC

(57) ABSTRACT

In a sample pretreatment device, a container storage section (2) holds multiple containers, including a first well plate having wells in an N×M matrix form and a second well plate having N elongated wells whose length corresponds to M wells in one row of the first well plate or M elongated wells whose length corresponds to N wells in one column of the first well plate. A dispensing section (3) includes: a platform (30) on winch containers can be placed; a pipette unit (311, 312) including an M-channel tip corresponding to M wells in one row of the first well plate or an N-channel tip corresponding to N wells in one column of the first well plate; and a pump unit (313) for suctioning/ejecting a liquid from/into a container on the platform through the pipette unit. A transfer section (4) transfers containers between the container storage section and the platform. A controller (5) controls operations of the dispensing section and the transfer section.

6 Claims, 7 Drawing Sheets

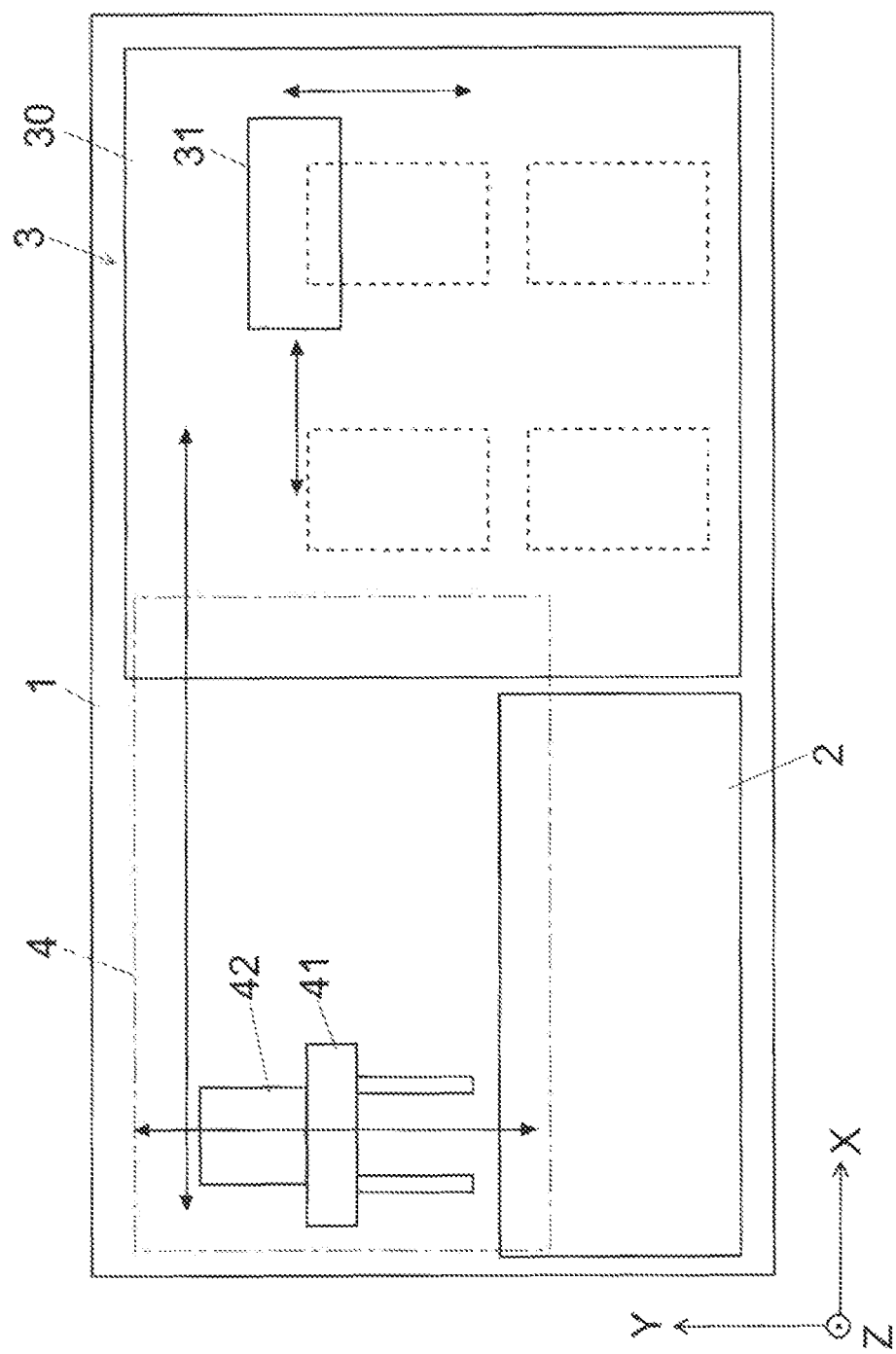

SAMPLE PRETREATMENT DEVICE

TECHNICAL FIELD

The present invention relates to a sample pretreatment device for pretreating samples to be subjected to an analysis or measurement, and more specifically, to a sample pretreatment device for pretreating a large number of liquid samples using reagent solutions or other types of reagents.

BACKGROUND ART

Amyloid p, which is a kind of peptide produced in human bodies, is considered to be deeply involved in the development of Alzheimer's disease, which is a major cause of dementia (amyloid p may hereinafter be abbreviated as "Aβ"). It is said that a deposition of Aβ all over the brain induces an alteration or loss of healthy neural cells, which causes a progressive shrinkage of the brain. Therefore, for an early diagnosis of Alzheimer's disease, it is important to correctly determine the state of deposition of Aβ in the brain.

In recent years, an IP-MS method, which is the combination of an immunoprecipitation (IP) method and matrix assisted laser desorption/ionization time-of-flight mass spectrometry, has been proposed and drawing attention as a method for determining whether or not there is a deposition of Aβ in the brain. For example, in Non Patent Literature 1 and 2, a composite biomarker consisting of the ratio of Aβ-related peptides APP669-711/Aβ1-42 combined with the ratio of Aβ1-40/Aβ1-42 has been reported to be a prospective blood biomarker for the cerebral amyloid deposition (where APP is the abbreviation for the amyloid precursor protein of Aβ).

A large-scale testing for Aβ by the IP-MS method requires a simultaneous and quick processing of a large number of specimens (plasma samples) by the IP method. This type of processing indispensably requires a sample pretreatment device including a dispensing mechanism for automatically dispensing specimens and a plurality of kinds of reagent solutions. The use of the automatic sample pretreatment device for a pretreatment related to the IP method is also important in order to improve the reproducibility of repetitive operations which should always be performed in the same manner without depending on the levels of skill and/or experience of the operator.

Examples of the conventionally known automatic dispensing devices used for this type of processing include "Bravo" (manufactured by Agilent Technologies, Inc.), "NIMBUS" (Thermo Fisher Scientific Inc.), "epMotion" (Eppendorf AG), "Microlab" (Hamilton Company) and "Biomak" (Beckman Coulter, Inc.). These conventional automatic dispensing devices allow for various operations with widely used 96-well plates, such as the dispensing of a liquid from one well on one 96-well plate to one well on another 96-well plate, from a reservoir to each well on a 96-well plate, or from a microtube or conical tube to each well on a 96-well plate.

CITATION LIST

Non Patent Literature

Non Patent Literature 1: Kaneko N and 12 other authors, "Novel plasma biomarker surrogating cerebral amyloid deposition". Proc. Jpn. Acad., Ser. B, Phys. Biol. Sci., 2014, Vol. 90, No. 9, pp. 353-364

Non Patent Literature 2: Nakamura A and 19 other authors, "High performance plasma amyloid-β biomarkers for Alzheimer's disease", Nature, 2018, Vol. 554, No. 7691, pp. 249-254

SUMMARY OF INVENTION

Technical Problem

As disclosed in Non Patent Literature 1 or 2, or other related documents, the IP treatment in the IP-MS method includes two stages of affinity purification. Its processing steps are complex and require a considerable number of reagent solutions. Furthermore, some of those reagent solutions must be previously put into the wells of 96-well plates (or 384-well plates) so that the operation can proceed to a simultaneous treatment. Manually dispensing a plurality of reagent solutions into a plurality of 96-well plates not only requires a considerable amount of time and labor but may also cause problems such as the dispensing or mixing of an incorrect reagent solution. The use of an automatic dispensing device as mentioned earlier ensures correct dispensing of each reagent solution from a microtube or conical tube which contains the solution into the wells of a 96-well plate. However, the dispensing operation requires a considerable amount of time. The larger the number of reagent solutions is, the longer the dispensing time becomes, causing a decrease in the efficiency of the pretreatment.

The present invention has been developed to solve the previously described problem. Its primary objective is to provide a sample pretreatment device which can efficiently dispense a plurality of kinds of reagent solutions into the wells on each of the separate well plates and thereby shorten the period of time required for the dispensing task so that the pretreatment can be efficiently performed.

Solution to Problem

One mode of the sample pretreatment device according to the present invention developed for solving the previously described problem includes:

a container storage section capable of holding a plurality of containers including a first well plate in which wells are formed in a matrix form with N rows and M columns (where both N and M are integers equal to or greater than two), and a second well plate in which N elongated wells whose length corresponds to the M wells in one row of the first well plate are formed, or in which M elongated wells whose length corresponds to the N wells in one column of the first well plate are formed:

a dispensing section including a working platform on which the containers can be placed, a pipette unit including an M-channel tip corresponding to the M wells in one row of the first well plate or an N-channel tip corresponding to the N wells in one column of the first well plate, as well as a pump unit configured to suction and eject a liquid from and into a container placed on the working platform through the pipette unit;

a transfer section configured to transfer the containers between the container storage section and the working platform; and a controller configured to control an operation of the dispensing section and the transfer section so as to perform the following operations: a transferring operation in which the second well plate in which reagent solutions for a pretreatment are respectively contained in L elongated wells (where L is an integer equal to or greater than two as well as equal to or less than N or M) and L pieces of the first well plates which are empty, prepared in the container storage section, are individually transferred from the container storage section to the working platform; a reagent-solution-dispensing operation in which a dispensing operation is performed for each of the L prepared reagent solutions on the working platform, where the dispensing operation includes suctioning one of the L reagent solutions contained in the elongated wells of the second well plate containing the reagent solutions and dispensing the suctioned reagent solution into the wells of one of the L first well plates which are empty, using the M-channel tip or the N-channel tip; a sample-injecting operation, performed on the working platform, in which samples are individually injected into the wells of the first well plate in which a first reagent solution is already dispensed; and a mixed-solution-injecting operation, performed on the working platform after the reagent-solution-dispensing operation, in which a mixed solution of the first reagent solution and a sample is suctioned from each well of the first well plate containing the mixed solution and injected into one of the wells of the first well plate in which a second reagent solution to be used in a second stage of a pretreatment is already dispensed, after the first well plate containing the second reagent solution is transferred from the container storage section to the working platform in the case where the first well plate containing the second reagent solution is already returned from the working platform to the container storage section.

For example, when a 9-well plate which is commonly used as a standard well plate is used as the first well plate, N=8 and M=12, or vice versa. When a 384-well plate is used as the first well plate, N=16 and M=24, or vice versa.

Advantageous Effects of Invention

In one mode of the sample pretreatment device according to the present invention, each of the reagent solutions contained in a plurality of elongated wells of the second well plate is dispensed into M or N wells of the first well plate at one time, using the M-channel or N-channel tip of the pipette unit. By repeating this operation multiple times, the dispensing of one reagent solution into the N×M wells of one first well plate can be completed. This operation is carried out for each of the L reagent solutions to prepare L first well plates which respectively contain different kinds of reagent solutions.

Thus, in one mode of the sample pretreatment device according to the present invention, even when there are a considerable number of reagent solutions to be used for the pretreatment, the device can dispense each of those reagent solutions into the wells on one of the separate well plates, so that the period of time required for dispensing the reagent solutions can be shortened.

When there are a large number of reagent solutions, there will also be a large number of well plates into which those reagent solutions need to be dispensed. Even a complex pretreatment using a large number of reagent solutions can be performed on a working platform having a comparatively small area by handing the well plates as follows: well plates containing reagent solutions which will neither be used immediately nor in an early stage of the pretreatment are temporarily returned to the container storage section, and when a specific reagent solution is needed for the pretreatment, the well plate containing that reagent solution is transferred from the container storage section to the dispensing section. This allows the sample treatment device to be smaller in size, and particularly, in installation area.

According to one mode of the sample pretreatment device according to the present invention, a highly versatile pretreatment device can be provided which can flexibly deal with various pretreatments that differ from each other in the number of operation stages or number of reagent solutions to be used.

BRIEF DESCRIPTION OF DRAWINGS

FIG. 1B is a top view roughly showing an external appearance of the sample pretreatment device according to the present embodiment.

DESCRIPTION OF EMBODIMENTS

In advance of the description of a sample pretreatment device according to the present invention, one example of the procedure of an IP treatment for an Aβ measurement using the aforementioned IP-MS method will be described with reference to the drawings.

[Procedure of IP Treatment]

Figure 3:
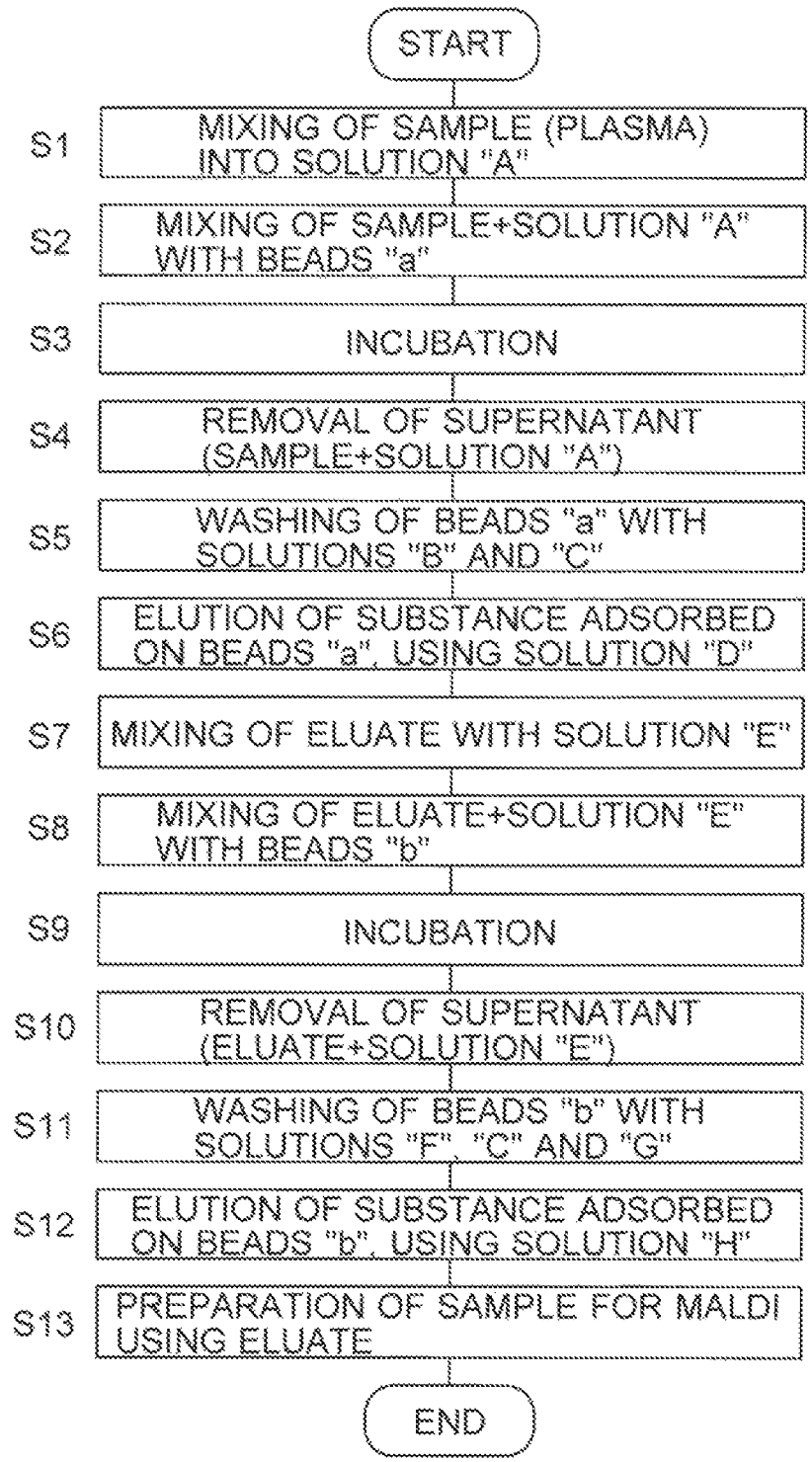
FIG. 3 is a flowchart showing one example of the procedure of the pretreatment (IP treatment) and sample preparation for an AP measurement using the IP-MS method.

FIG. 3 is a flowchart showing one example of the procedure of an IP treatment for an Aβ measurement. The procedure itself has already been published in Non Patent Literature 1, 2 or other related documents.

The sample (specimen) is the plasma extracted from a blood sample collected from a subject. Seven reagent solutions, called solutions "A", "B", "C", "D", "E", "F" and "G", are used for the pretreatment. Additionally, two kinds of beads, called beads "a" and "b", are used as the beads on which specific kinds of antibodies for affinity purification are fixed. No detailed description of the reagent solutions will be hereinafter given since they are not related to the gist of the present invention. As for the specific kinds of reagent solutions, those disclosed in Non Patent Literature 1, 2 or other related documents can be used.

Initially, a sample is mixed with solution "A" (Step S1). The mixture of the sample and solution "A" is put into and stirred in a container (well) which contains beads "a" (Step S2). The container with beads "a" is incubated in this state for an appropriate period of time (e.g., one hour) to promote the reaction between the target component in the sample (or more exactly, a compound containing the target component) and the antibody fixed on beads "a" (Step S3). Consequently, the target component in the sample is supported by the beads. Subsequently, the supernatant in the container, i.e., the mixture of the sample and solution "A", is removed, leaving beads "a" (Step S4).

Then, the beads "a" with the target component supported on their surfaces are washed with solutions "B" and "C" (Step S5). Most of the foreign substances which are simply put on the beads are thereby washed off. Subsequently, solution "D" is put into and stirred in the container which contains the washed beads "a", whereby the target component supported on beads "a" is eluted into solution "D" (Step S6). The steps described so far correspond to the first stage of the affinity purification.

The solution "D" containing the target component, i.e., the eluate, is subsequently collected from the container and mixed with solution "E" (Step S7). The mixture of the eluate and solution "E" is put into and stirred in a container which contains beads "b" (Step S8). As in Step S3, the container containing beads "b" is incubated in this state for an appropriate period of time (e.g., one hour) to promote the reaction between the target component in the sample (or more exactly, a compound containing the target component) and the antibody fixed on beads "b" (Step S9). Consequently, the target component in the eluate is supported by beads "b". Subsequently, the supernatant, i.e., the mixture of the eluate and solution "E", is removed, leaving beads "b" in the container (Step S10).

Then, the beads "b" with the target component supported on their surfaces are sequentially washed, using solutions "F", "C" and "G" in the mentioned order (Step S11). The washed beads "b" are subsequently mixed with solution "H", whereby the target component supported on beads "b" is eluted into solution "H" (Step S12). It should be noted that acetonitrile, which is volatile, is added to solution "H" immediately before the elution process. The steps described so far correspond to the second stage of the affinity purification, by which an eluate consisting of acetonitrile with the target component dissolved is consequently obtained. This eluate is dropped onto a sample plate for MALDI. After a matrix is added, the mixture is dried to obtain a sample for MALDI (Step S13).

As described to this point, an Aβ measurement using the IP-MS method requires considerably complex operations to extract an Aβ-related substance to be analyzed from a plasma sample. A sample pretreatment device according to one embodiment of the present invention can automatically perform the previously described series of operations without manual assistance.

[Configuration of Sample Pretreatment Device According to Present Embodiment]

Figure 1A:
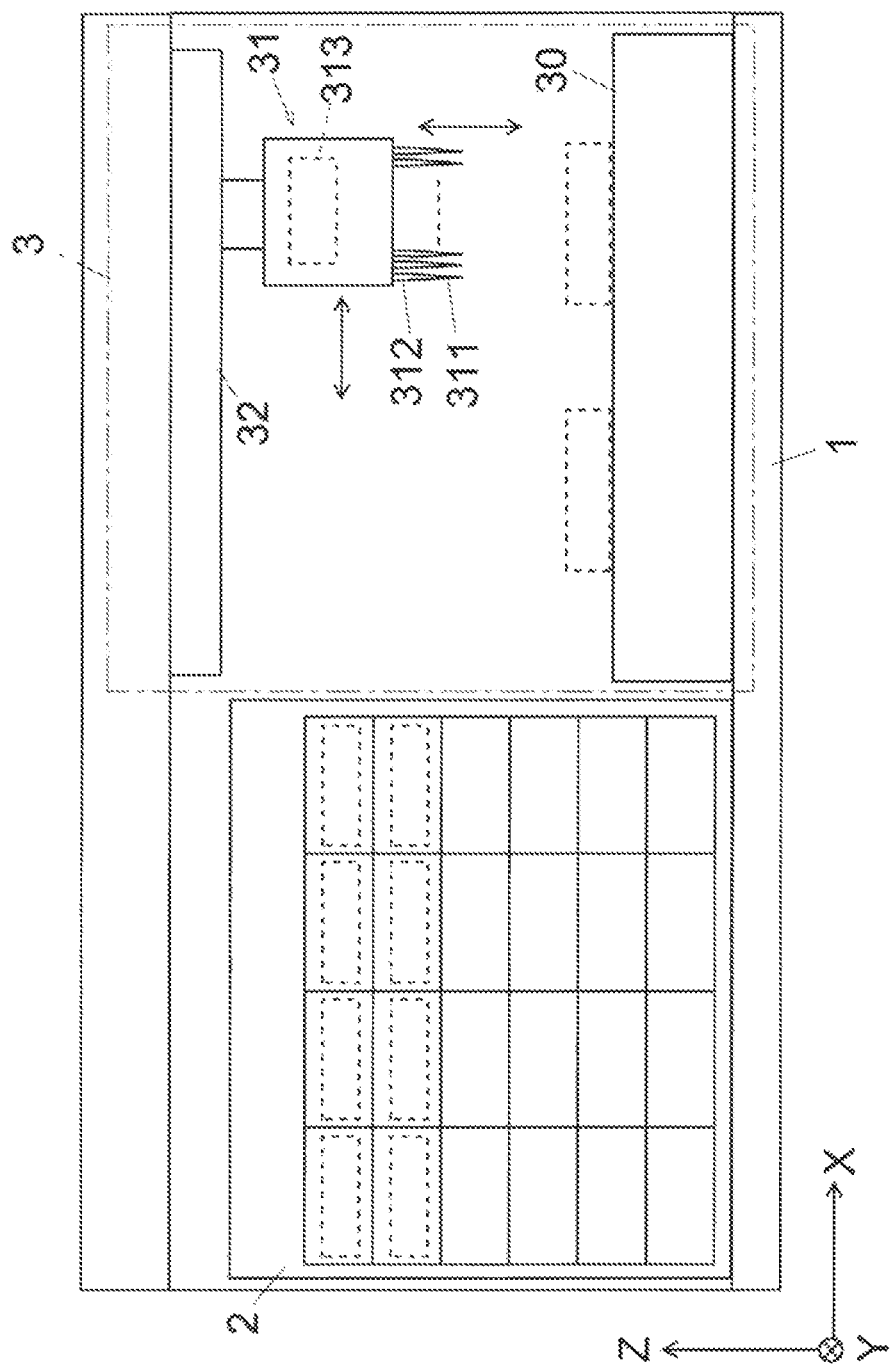
FIG. 1A is a front view roughly showing an external appearance of a sample pretreatment device as one embodiment of the present invention.
Figure 2:
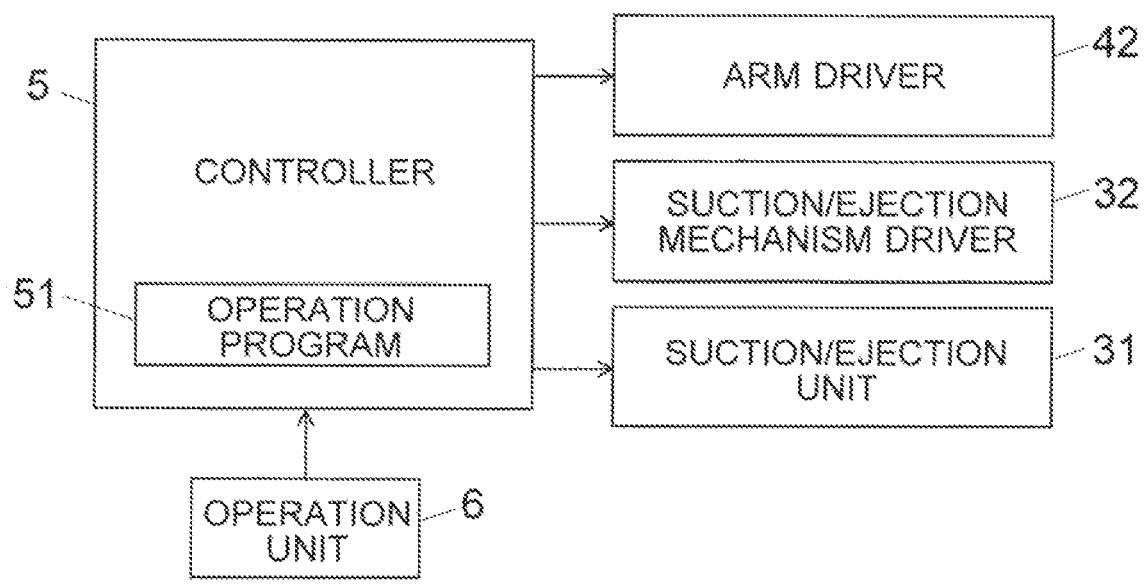
FIG. 2 is a block configuration diagram of a control system of the sample pretreatment device according to the present embodiment.

FIGS. 1A and 1B are diagrams roughly showing an external appearance of the sample pretreatment device according to the present embodiment, where FIG. 1A is a rough front view, and FIG. 1B is a rough top view. FIG. 2 is a block configuration diagram of a control system of the sample pretreatment device according to the present embodiment. It should be noted that FIGS. 1A and 1B are rough diagrams which merely show necessary components for the explanation. For convenience of description, the three axes of X, Y and Z orthogonal to each other are defined within the space as shown in FIGS. 1A and 1B. The plane on which the device is installed is parallel to the X-Y plane.

As shown in FIGS. 1A and 1B, the sample pretreatment device according to the present embodiment has a base plate 1, on which a container storage section 2, dispensing section 3, and container transfer section 4 are provided. The container transfer section 4 is configured to transfer a container, such as a well plate, between the container storage section 2 and the dispensing section 3. Furthermore, as shown in FIG. 2, the sample pretreatment device according to the present embodiment includes a controller 5 and an operation unit 6 serving as a user interface.

The container storage section 2 is a kind of shelf capable of holding a large number of containers of various kinds, such as well plates, reservoirs and tube racks, which are sized in conformity with the SBS (Society for Biomolecular Screening) standards.

The dispensing section 3 includes: a working platform 30 on which a plurality of well plates or other types of containers can be placed; a suction/ejection unit 31 for suctioning a liquid from, for example, a well of a well plate placed on the working platform 30 or ejecting a liquid into a well; and a suction/ejection mechanism driver 32 configured to drive the suction/ejection unit 31 in the X-Y plane as well as in the Z-axis direction, or the height direction. The suction/ejection unit 31 includes a pipette unit 312 having a tip portion fitted with tips 311 which will come in contact with a liquid to be suctioned and ejected, as well as a pump unit 313 for suctioning or ejecting a liquid through the pipette unit 312. In the present example, a 12-channel tip having 12 tips formed as one unit is used as the tips 311 so as to enable the simultaneous dispensing of a solution from an 8-well plate, which will be described later. A plurality of plates including a magnet plate and a cooling plate on which a well plate is to be placed are provided on the working platform 30. Those plates will also be described later.

The container transfer section 4 includes an arm mechanism 41 configured to hold a container, such as a well plate, and an arm driver 42 configured to drive the arm mechanism 41 in each of the three axial directions of X, Y and Z within a predetermined range.

The controller 5 operates the arm driver 42, suction/ejection unit 31 (pump unit 313) and suction/ejection mechanism driver 32 according to a preinstalled operation program 51 so as to perform a series of pretreatment operations including a dispensing operation, as will be described later.

At least some of the functions of the controller 5 can be realized by using a personal computer as a hardware resource and executing, on that computer, dedicated software previously installed on the same computer.

[Containers to be Used for Pretreatment]

Figure 5:
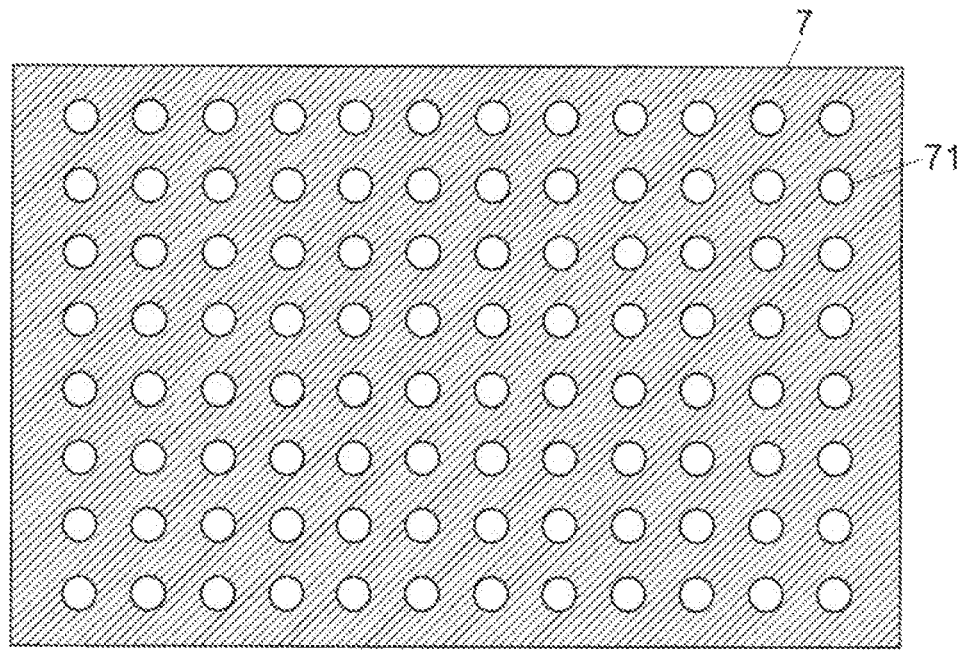
FIG. 5 is a schematic plan view of a 96-well plate used in the sample pretreatment device according to the present embodiment.
Figure 6:
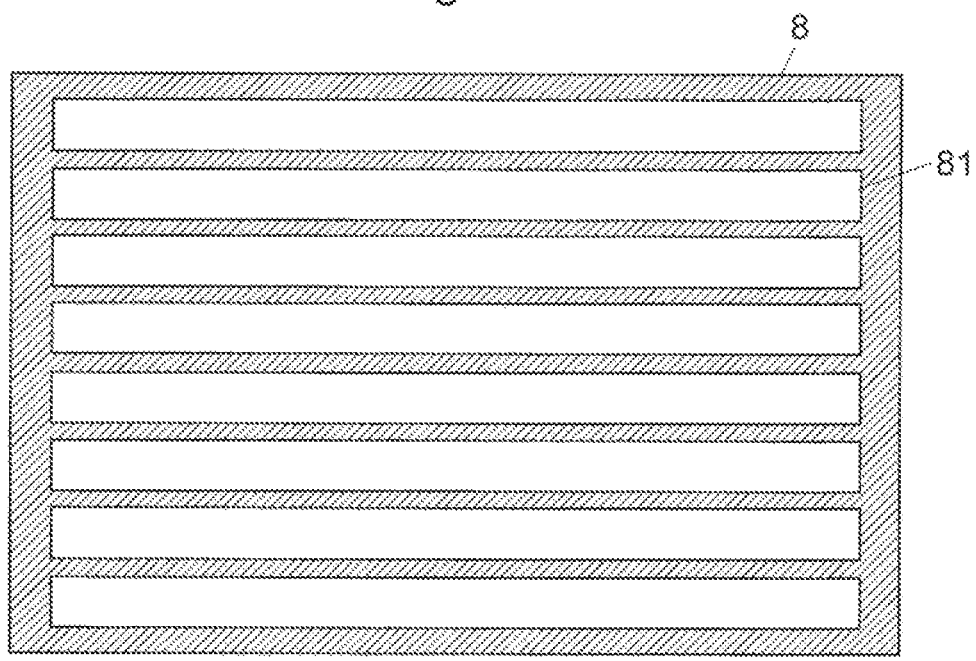
FIG. 6 is a schematic plan view of an 8-well plate (8-lane reservoir plate) used in the sample pretreatment device according to the present embodiment.
Figure 7:
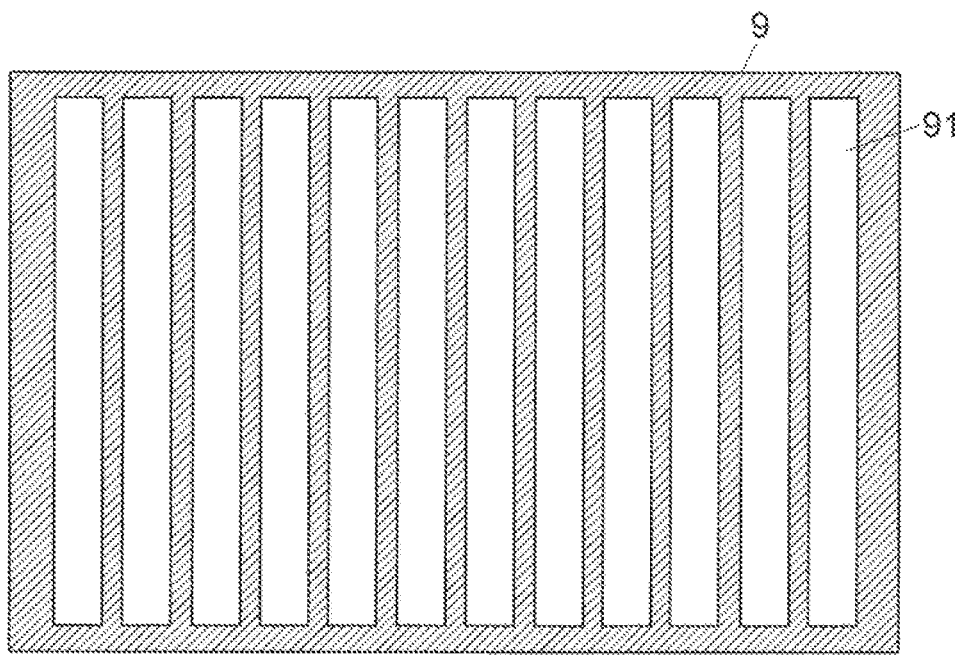
FIG. 7 is a schematic plan view of a 12-well plate (12-lane reservoir plate) used in the sample pretreatment device according to the present embodiment.

In order to carry out the previously described series of processes by the sample pretreatment device according to the present embodiment, a plurality of types of containers are used. FIGS. 5-7 are plan views showing representative well plates. Specifically, FIG. 5 is a plan view of a 96-well plate, FIG. 6 is a plan view of an 8-well plate, and FIG. 7 a plan view of a 12-well plate.

The 96-well plate 7 shown in FIG. 5 is in conformity with the SBS standards. This plate consists of a plate member made of synthetic resin, on which 96 wells 71 of the same diameter and depth are arranged in a matrix form with 8 rows and 12 columns. For example, Eppendorf Twin.Tec® PCR Plates, manufactured by Eppendorf AG, or Axygen® 96-well PCR plates, manufactured by Corning Incorporated, can be used as the 96-well plate 7. There are two types of 96-well plates 7 which differ from each other in the depth of the wells 71, i.e., the deep well type and PCR type. The wells 71 of the former plate are deeper and have a larger capacity than those of the latter.

The 8-well plate 8 shown in FIG. 6 is also in conformity with SBS standards. This plate consists of a plate member which is identical in size to the 96-well plate 7, on which 8 trough-like elongated wells 81 are formed whose length entirely covers one row of the 12 wells arranged on the 96-well plate 7. For example, Axygen® Multiple Well Reagent Reservoir with 8-Channel Trough, High Profile, manufactured by Corning Incorporated, can be used as the 8-well plate 8.

Similarly, the 12-well plate 9 shown in FIG. 7 is in conformity with the SBS standards. This plate consists of a plate member which is identical in size to the 96-well plate 7, on which 12 trough-like elongated wells 91 are formed whose length entirely covers one column of the 8 wells arranged on the 96-well plate 7. For example, Axygen® Multiple Well Reagent Reservoir with 12-Channel Trough. High Profile, manufactured by Corning Incorporated, can be used as the 12-well plate 9.

In the processing which will be described later, a high-capacity reservoir and other types of containers which are in conformity with the SBS standards are also used other than the aforementioned well plates.

[Pretreatment Operations in Sample Pretreatment Device According to Present Embodiment]

Hereinafter described are the tasks and device operations for performing the IP treatment shown in FIG. 3 using the sample pretreatment device according to the present embodiment.

Figure 4:
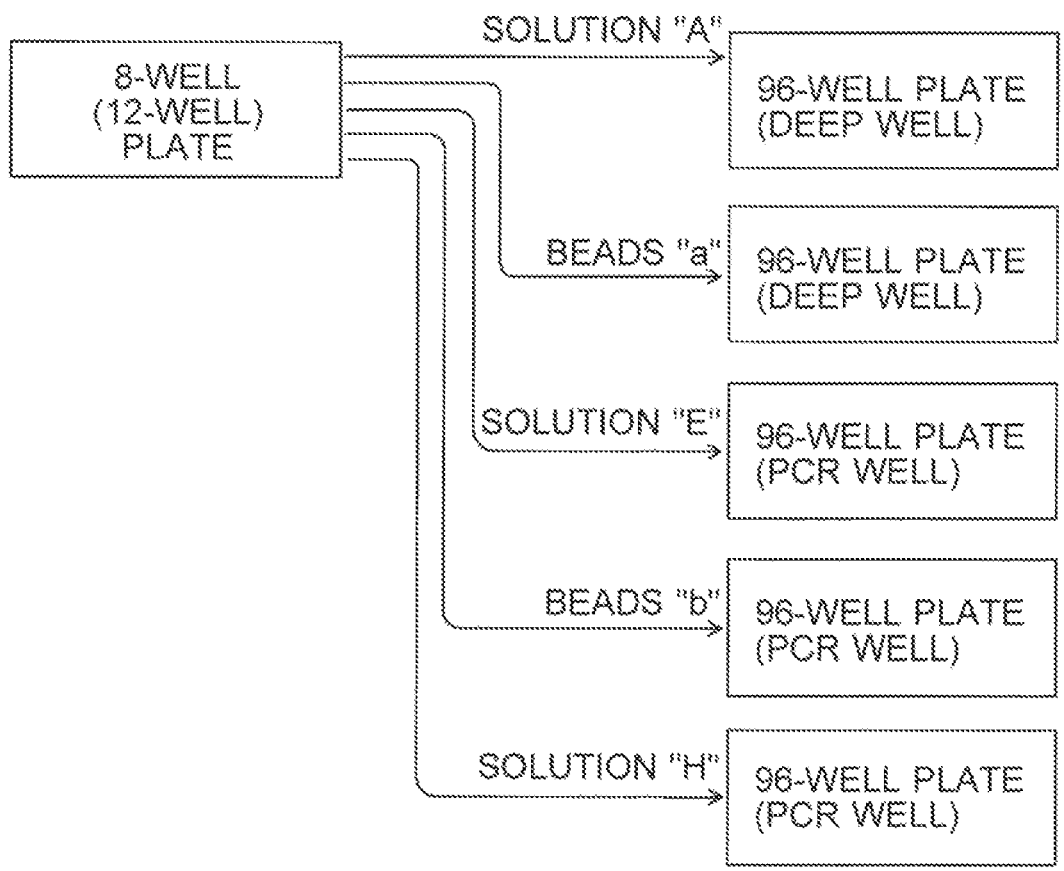
FIG. 4 is a diagram illustrating how reagent solutions are dispensed for performing an IP treatment using the sample pretreatment device according to the present embodiment.

As a preparative process, an operator injects different kinds of reagent solutions necessary for the pretreatment into the wells 81 of one 8-well plate (or 12-well plate 9), with one reagent solution in each well. An 8-well plate allows for the use of a maximum of 8 kinds of reagent solutions, while a 12-well plate 9 allows for the use of a maximum of 12 kinds of reagent solutions. For the present case, as shown in FIG. 4, five kinds of reagent solutions, which are solution "A", beads "a" (in suspension), solution "E", beads "b" (in suspension), and solution "H", are respectively put in five of the eight elongated wells 81 of the 8-well plate 8. The other reagent solutions, which are solutions "B", "C", "D", "F" and "G", are contained in respective reservoirs.

The operator subsequently sets the following containers at their respective specified positions in the container storage section 2: the 8-well plate 8 containing the five aforementioned reagent solutions (this well plate will be hereinafter called the "reagent-solution plate"), the reservoirs containing the five reagent solutions, empty 96-well plates 7 whose number is the same as that of the kinds of reagent solutions (in the present case, five), and a tube rack which holds 96 tubes that contain samples (specimens). The five empty 96-well plates 7 include two deep-well type and three PCR-well type plates. After the preparation for an automatic pretreatment is thus completed, the operator using the operation unit 6 performs a predetermined operation to initiate the processing.

Upon receiving the command to initiate the processing, the controller 5 operates the arm driver 42 to transfer the reagent-solution plate and each of the five empty 96-well plates 7 from the container storage section 2 to their respective positions on the working platform 30 in the dispensing section 3. If the working platform 30 has a space for the five empty 96-well plates 7 to be horizontally arranged, or if the five empty %-well plates 7 are vertically stackable, all of the five empty 96-well plates 7 may be transferred onto the working platform 30 before the dispensing of the reagent solutions (which will be described later) is initiated. If there is no such space on the working platform 30, the arm driver 42 can be operated to repeat the steps of transferring one empty 96-well plate 7 onto the working platform 30, returning the 96-well plate 7 with a dispensed reagent solution to the container storage section 2 after the completion of the dispensing of the reagent solution, and transferring another empty 96-well plate 7 from the container storage section 2 onto the working platform 30.

After the reagent-solution plate and the empty 96-well plates 7 have been placed at their predetermined positions on the working platform 30, the controller 5 operates the suction/ejection mechanism driver 32 to transfer the suction/ejection unit 31 to a position above the reagent-solution plate. Subsequently, the suction/ejection unit 31 is lowered until the tips (12-channel tip) 311 are immersed in the reagent solution in one of the elongated wells of the reagent-solution plate. That is to say, all tips of the 12-channel tip are immersed in the same kind of reagent solution. Then, the pump unit 313 in the suction/ejection unit 31 is energized to suction the reagent solution into the tips of the 12-channel tip 311 and hold it. The controller 5 subsequently operates the suction/ejection mechanism driver 32 to lift the suction/ejection unit 31 upward and transfer it to a position above one of the empty 96-well plates 7. Then, the suction/ejection unit 31 is lowered to an appropriate position and is operated to simultaneously eject the reagent solution held in the 12 tips into the 12 wells 71 arranged in one row on the empty 96-well plate 7. Thus, one kind of reagent solution is dispensed into the 12 wells 71 in one 96-well plate 7 at one time. By performing this operation eight times, the same kind of reagent solution is dispensed into all wells 71 in one 96-well plate 7.

The operation is further performed in a similar manner for each of the four other kinds of reagent solutions prepared on the reagent-solution plate, so as to dispense each reagent solution into the wells 71 of a different 96-well plates 7 which is empty. Thus, as shown in FIG. 4, the different kinds of reagent solutions, which are solution "A", beads "a", solution "E", beads "b" and solution "H", are respectively dispensed into the five 96-well plates which are initially prepared as empty plates.

The controller 5 subsequently operates the arm driver 42 to transfer, from the working platform 30 to the container storage section 2, the reagent-solution plate from which the reagent solutions have been dispensed and the five 96-well plates 7 which respectively contain reagent solutions. The 96-well plate 7 into which the reagent solution to be used in the first process (Step S1 in FIG. 3) of the pretreatment (in the present case, solution "A") has been dispensed may be left on the working platform 30 as needed (e.g., if the pretreatment will be initiated soon after the dispensing operation). Additionally, as explained earlier, an operation including the steps of transferring one empty 96-well plate 7 from the container storage section 2 onto the working platform 30, dispensing a reagent solution into the 96-well plate 7, and temporarily returning the same 96-well plate 7 to the container storage section 2 after the completion of the dispensing step may be sequentially repeated for each of the empty 96-well plates 7.

After the completion of the dispensing of the reagent solutions, the controller 5 operates the arm driver 42 to transfer, from the container storage section 2 onto the working platform 30, the 96-well plate 7 which contains solution "A", i.e., the reagent solution to be used in the first stage (Step S1 in FIG. 3) of the IP treatment, as well as the tube rack which holds the tubes that contain samples (specimens). Understandably, only the tube rack needs to be transferred if the 96-well plate 7 which contains solution "A" is already on the working platform 30.

Subsequently, the controller 5 operates the suction/ejection mechanism driver 32 and the suction/ejection unit 31 to suction a predetermined amount of sample from each tube in the tube rack by the suction/ejection unit 31 and inject the sample into one of the wells in the 96-well plate 7 which contains solution "A". In this operation, as needed, the liquid in the well (the mixture of solution "A" and the sample) may be suctioned and ejected one or more times to promote the mixing of solution "A" and the sample. The operations are similarly repeated until each of the different samples is mixed with solution "A" in one of the wells of the 96-well plate 7. Thus, the solution in each well of the 96-well plate 7 in which only solution "A" was initially contained becomes a mixed solution of solution "A" and a sample. After the suction of the samples has been completed, the tube rack is returned to the container storage section 2 by the container transfer section 4.

As noted earlier, an 8-channel or 12-channel tip is used as the tips 311 when the reagent solutions are dispensed at the beginning of the processing. For the mixing of a sample and solution "A" as well as the subsequent processes, a multi-channel tip different from the 8-channel or 12-channel tip may be used as the tips 311. For example, a 96-channel tip with which the suction and ejection of a liquid can be performed for all wells at one time may be used.

The controller 5 subsequently operates the arm driver 42 to transfer, from the container storage section 2 onto the magnet plate on the working platform 30, the 96-well plate 7 which contains beads "a", which are the reagent solution to be used in the first stage of the affinity purification (Steps S2-S6 in FIG. 3) in the IP method. This transfer is unnecessary if the 6-well plate 7 containing beads "a" is already on the magnet plate (i.e., if the %-well plate 7 containing beads "a" has not been returned to the container storage section 2 after the completion of the dispensing operation). The magnet plate is a base plate equipped with a magnet and has the effect of attracting the beads in the wells by magnetic force. Accordingly, the beads (which are not only beads "a" but also beads "b") in each well of the 96-well plate 7 placed on the magnet plate stick to the inner bottom or side surface of the well.

The controller 5 operates the suction/ejection mechanism driver 32 and the suction/ejection unit 31 to inject each of the mixed solutions previously prepared by mixing each sample with solution "A", into one of the wells of the 96-well plate 7 that contains beads "a". Once again, as needed, the liquid in the well may be suctioned and ejected one or more times to promote the mixing. When the reagent solution used here is a bead suspension containing beads "a", an operation for removing the supernatant of the suspension by suction may be performed beforehand. In this operation, only the supernatant can be suctioned, leaving the beads in the wells, since the beads are held on the inner bottom of the wells by magnetic force.

After the mixed solutions of solution "A" and samples have been injected into the 96-well plate 7 which contains beads "a" in each well in the previously described manner, the 96-well plate 7 is incubated on the cooling plate provided on the working platform 30 for a predetermined period of time (e.g., one hour) in order to promote the antigen-antibody reaction. During the incubation, the operation of suctioning and ejecting the liquid in each well by the suction/ejection unit 31 is continuously performed for the predetermined period of time, or intermittently performed at constant intervals of time, in order to maintain the beads in the suspended state in each well of the 96-well plate 7. The incubation does not always need to be performed on the working platform 30; a separate space for incubation may be provided apart from the working platform 30. This space may be provided in the container storage section 2. This allows the processing of Steps S1 and S2 to be performed for another set of samples while the incubation for the samples in one 96-well plate 7 is being carried out.

After the incubation of one 96-well plate 7 has been completed, the 96-well plate 7 is returned onto the working platform 30, and the processing corresponding to Steps S4 through S12 is sequentially performed on the working platform 30, using solutions "B", "C", "D", "E", "F", "G" and "H" as well as beads "b". In any of these sequential tasks, the well plate or reservoir which contains the necessary reagent solution for the task is transferred from the container storage section 2 onto the working platform 30. After the completion of the task, the well plate or reservoir can be returned to the container storage section 2.

At the point where the processing corresponding to Step S12 has been completed, a 96-well plate 7 in which beads "b" and solution "H" as the eluate are contained in each well is on the working platform 30. In the solution "H" in each well, an Aβ-related peptide derived from the sample which was supported on beads "b" is eluted. The eluates contained in the wells at this point are the sample solutions which are end products of the pretreatment by the IP method. The controller 5 subsequently operates the suction/ejection mechanism driver 32 and the suction/ejection unit 31 to suction a predetermined amount of solution from each well of the pretreated 96-well plate 7 and drops it onto a sample plate prepared for MALDI. A prepared matrix is subsequently added to each of the spots on the sample plate, which are air-dried to obtain samples for MALDI. Thus, the sample pretreatment device according to the present embodiment is configured to additionally function as a spotting device, so that the processing can be continuously performed through to the preparation of the samples for MALDI. The sample preparation may also be performed by previously dropping the matrix onto the sample plate for MALDI and subsequently dropping the solutions in the wells of the pretreated 96-well plate 7 onto the spots of the matrix, respectively.

As another possibility, a separate handling mechanism may be provided to transfer the pretreated 96-well plate 7 from the sample pretreatment device according to the present embodiment to a separate spotting device, which prepares the samples for MALDI by individually dropping the solutions in the wells onto the sample plate for MALDI, adding the matrix to the spots of the solution, and air-drying those spots.

In the previously described manner, the sample pretreatment device according to the present embodiment can automatically perform a series of processing by the IP method for an Aβ measurement.

As described earlier, the sample pretreatment device according to the present embodiment uses an 8-channel or 12-channel tip when dispensing each of the reagent solutions into the wells of one well plate. As compared to a conventional method in which a reagent solution is dispensed from a plurality of microtubes or conical tubes into the wells of a 96-well plate, the period of time for dispensing the reagent solution can be reduced to one eighth of the conventionally required period of time when a 12-well plate and an 8-channel tip are used. Using an 8-well plate and a 12-channel tip can shorten the period of time for dispensing the reagent solution to one twelfth. The larger the number of kinds of reagent solutions to be dispensed is, the more noticeable the time-reducing effect for the dispensing operation becomes.

In the sample pretreatment device according to the present embodiment, well plates and reservoirs in which a large number of reagent solutions are separately prepared are stored in the container storage section 2. The pretreatment is carried out in such a manner that only the necessary containers for the ongoing task are transferred onto the working platform 30 and returned to the container storage section 2 after the completion of the task. Therefore, even a complex pretreatment winch uses a large number of reagent solutions requires a comparatively small working area for dispensing or injecting solutions. This reduces the entire size of the pretreatment device and allows the device to be installed on a small space.

It should be noted that the previously described embodiment and its variations are mere examples of the present invention. Any change, modification, addition or the like appropriately made within the spirit of the present invention will naturally fall within the scope of claims of the present application. For example, although a 96-well plate which is commonly used as a standard well plate is used for the processing in the sample pretreatment device according to the previous embodiment, the device may be configured to use a 384-well plate which has four times as many wells as a 96-well plate. It is needless to say that the device can deal with various types or procedures of the pretreatment by replacing the operation program with another one.

Various Modes of Invention

A person skilled in the art can understand that the previously described illustrative embodiment is a specific example of the following modes of the present invention.

(Clause 1) One mode of the sample pretreatment device according to the present invention includes:

a container storage section capable of holding a plurality of containers including a first well plate in which wells are formed in a matrix form with N rows and M columns (where both N and M are integers equal to or greater than two), and a second well plate in which N elongated wells whose length corresponds to the M wells in one row of the first well plate are formed, or in which M elongated wells whose length corresponds to the N wells in one column of the first well plate are formed:

a dispensing section including a working platform on which the containers can be placed, a pipette unit including an M-channel tip corresponding to the M wells in one row of the first well plate or an N-channel tip corresponding to the N wells in one column of the first well plate, as well as a pump unit configured to suction and eject a liquid from and into a container placed on the working platform through the pipette unit:

a transfer section configured to transfer the containers between the container storage section and the working platform; and a controller configured to control an operation of the dispensing section and the transfer section so as to perform the following operations: a transferring operation in which the second well plate in which reagent solutions for a pretreatment are respectively contained in L elongated wells (where L is an integer equal to or greater than two as well as equal to or less than N or M) and L pieces of the first well plates which are empty, prepared in the container storage section, are individually transferred from the container storage section to the working platform; a reagent-solution-dispensing operation in which a dispensing operation is performed for each of the L prepared reagent solutions on the working platform, where the dispensing operation includes suctioning one of the L reagent solutions contained in the elongated wells of the second well plate containing the reagent solutions and dispensing the suctioned reagent solution into the wells of one of the L first well plates which are empty, using the M-channel tip or the N-channel tip; a sample-injecting operation, performed on the working platform, in which samples are individually injected into the wells of the first well plate in which a first reagent solution is already dispensed; and a mixed-solution-injecting operation, performed on the working platform after the reagent-solution-dispensing operation, in which a mixed solution of the first reagent solution and a sample is suctioned from each well of the first well plate containing the mixed solution and injected into one of the wells of the first well plate in which a second reagent solution to be used in a second stage of a pretreatment is already dispensed, after the first well plate containing the second reagent solution is transferred from the container storage section to the working platform in the case where the first well plate containing the second reagent solution is already returned from the working platform to the container storage section.

Even when there are a considerable number of reagent solutions to be used for the pretreatment, the sample pretreatment device described in Clause 1 can efficiently dispense each of those reagent solutions into the wells on one of the separate well plates, so that the period of time required for dispensing the reagent solutions can be shortened. Furthermore, with the sample pretreatment device described in Clause 1, a highly versatile pretreatment device can be provided which can flexibly deal with various pretreatments that differ from each other in the number of operation stages or number of reagent solutions to be used.

(Clause 2) In the sample pretreatment device described in Clause 1, the controller may be configured to control the operation of the dispensing section and the transfer section to perform a returning operation after the reagent-solution-dispensing operation so as to return, from the working platform to the container storage section, the first well plate in which a reagent solution different from the first reagent solution to be used in a first stage of the pretreatment is already dispensed, and to transfer the first well plate containing the second reagent solution from the container storage section to the working platform in the mixed-solution-injecting operation.

With the sample pretreatment device described in Clause 2, even a complex pretreatment using a large number of reagent solutions can be performed on a working platform having a comparatively small area. This allows the sample treatment device to be smaller in size, and particularly, in installation area.

(Clause 3) In the sample pretreatment device described in Clause 1 or 2, the controller may be configured to control the operation of the dispensing section and the transfer section so as to return the second well plate from the working platform to the container storage section after the dispensing of the reagent solutions from the second well plate containing the reagent solutions into the first well plates which are empty is completed, as well as transfer a container which contains the samples from the container storage section to the working platform and dispense the samples.

The sample pretreatment device described in Clause 3 returns the used second well plate to the container storage section. Therefore, the operator can immediately retrieve the second well plate and perform the next task as needed. The container which contains samples can be placed in the container storage section along with the other containers. This simplifies the handling of the container.

(Clause 4) In the sample pretreatment device described in one of Clauses 1-3, the controller may be configured to carry out a mixing-promoting operation by performing suction and ejection of a liquid in each well when dispensing samples into the wells of the first well plate containing the first reagent solution.

(Clause 5) In the sample pretreatment device described in one of Clauses 1-4, the controller may be configured to carry out a mixing-promoting operation by performing suction and ejection of a liquid in each well when dispensing the mixed solution into the wells of the first well plate containing the second reagent solution.

In the sample pretreatment device described in Clause 4 or 5, the liquid contained in a well and a liquid to be added to that liquid can be quickly yet sufficiently mixed, whereby, for example, a reaction of the components in the two liquids can be promoted. This makes it possible to shorten the period of time for the pretreatment or perform a satisfactory pretreatment by improving the efficiency of the reaction.

(Clause 6) The sample pretreatment device described in one of Clauses 1-5 may further include a sample-preparing section configured to prepare samples for MALDI from a plurality of pretreated solutions obtained through the second and subsequent stages of the pretreatment on the working platform, by dropping each of the solutions onto a sample plate for matrix assisted laser desorption/ionization and mixing each of the solutions with a matrix on the sample plate.

The sample-preparing section may be configured to mix the pretreated solutions and the matrix by initially dropping the solutions onto the sample plate and subsequently dropping the matrix onto the spots of the solutions. It may alternatively be configured to mix the pretreated solutions and the matrix by initially dropping the matrix onto the sample plate and subsequently dropping the pretreated solutions before or after the matrix is dried.

With the sample pretreatment device described in Clause 6, the working process through to the preparation of the samples for MALDI can be carried out with a single device, so that the MALDI mass spectrometry can be performed with an even higher level of working efficiency.

(Clause 7) In the sample pretreatment device described in one of Clauses 1-6, N and M may be equal to 8 and 12, respectively, or 16 and 24, respectively.

The sample pretreatment device described in Clause 7 can perform pretreatments compatible with well plates and other types of containers which are in conformity with widely used standards.

REFERENCE SIGNS LIST

1 . . . Base Plate
2 . . . Container Storage Section
3 . . . Dispensing Section
30 . . . Working Platform
31 . . . Suction/Ejection Unit
311 . . . Tip
312 . . . Pipette Unit
313 . . . Pump Unit
32 . . . Suction/Ejection Mechanism Driver
4 . . . Container Transfer Section
41 . . . Arm Mechanism
42 . . . Arm Driver
5 . . . Controller
6 . . . Operation Unit
7 . . . 96-Well Plate
71 . . . Well
8 . . . 8-Well Plate
9 . . . 12-Well Plate
81, 91 . . . Elongated Well

The invention claimed is:

1. A sample pretreatment device, comprising:
a plurality of containers including a plurality of first well plates, each first plate of the plurality of first plates includes wells formed in a matrix form with N rows and M columns (where both N and M are integers equal to or greater than two), and a second well plate in which N elongated wells whose length corresponds to a length of a space in which the M wells in one row of the first well plate are formed, or in which M elongated wells whose length corresponds to a length of a space in which the N wells in one column of the first well plate are formed, a plurality of reagent solutions for a pretreatment are respectively contained in L elongated wells of the second well plate (where L is an integer equal to or greater than two and equal to or less than N or M;
a container storage section capable of holding the plurality of containers;
a dispensing section including a working platform on which the containers are configured to be placed, a pipette unit including M-channel tips corresponding to the M wells in one row of the first well plate or N-channel tips corresponding to the N wells in one column of the first well plate, and a pump unit configured to suction and eject a liquid from and into each container of the plurality of containers placed on the working platform through the pipette unit;
a transfer section configured to transfer the containers between the container storage section and the working platform; and
a controller programmed to control an operation of the dispensing section and the transfer section so as to perform following operations:
a transferring operation in which the second well plate and the plurality of first well plates are individually transferred from the container storage section to the working platform;
a reagent-solution-dispensing operation in which a dispensing operation is performed for each of the plurality of reagent solutions contained in the elongated wells of the second well plate, where the dispensing operation includes inserting the M-channel tips or the N-channel tips into a first elongated well of the plurality of elongated wells and suctioning a first reagent solution of the plurality of reagent solutions contained in the first elongated well using the M-channel tips or the N-channel tips and dispensing the suctioned first reagent solution into wells of one first well plate of the first well plates using the M-channel tips or the N-channel tips, and inserting the M-channel tips or the N-channel tips into a second elongated well of the plurality of elongated wells and suctioning a second reagent solution of the plurality of reagent solutions contained in the second elongated well using the M-channel tips or the N-channel tips and dispensing the suctioned second reagent solution into wells of another first well plate of the plurality of first well plates using the M-channel tips or the N-channel tips;
a sample-injecting operation, performed on the working platform, in which a plurality of different samples are individually injected into the wells of the one first well plate including the first reagent solution to provide mixed solutions, respectively, via the pipette unit using the M-channel tips or the N-channel tips or using a different multichannel tip; and a mixed-solution-injecting operation, performed on the working platform after the sample-injecting operation, in which the mixed solutions are respectively suctioned from each well of the one first well plate and injected into the wells of the other first well plate including the second reagent solution via the pipette unit using the M-channel tips or the N-channel tips or using the different multichannel tip;

a sample-preparing section configured to prepare samples for matrix assisted laser desorption/ionization (MALDI) from the plurality of pretreated solutions on the working platform, by dropping each of the solutions onto a sample plate for MALDI and mixing each of the solutions with a matrix on the sample plate.

2. The sample pretreatment device according to claim 1, wherein the controller is programmed to control the operation of the dispensing section and the transfer section to perform a returning operation after the reagent-solution-dispensing operation so as to return, from the working platform to the container storage section, the other first well plate in which the second reagent solution is already dispensed, and to transfer the other first well plate containing the second reagent solution from the container storage section to the working platform in the mixed-solution-injecting operation.

3. The sample pretreatment device according to claim 1, wherein the controller is programmed to control the operation of the dispensing section and the transfer section so as to return the second well plate from the working platform to the container storage section after a dispensing of the plurality of reagent solutions from the second well plate into the first well plates is completed, and transfer a sample container which contains the plurality of different samples from the container storage section to the working platform and dispense the samples.

4. The sample pretreatment device according to claim 1, wherein the controller is programmed to carry out a mixing-promoting operation by performing suction and ejection of a liquid in each well of the one first well plate when dispensing the plurality of different samples into the wells of the one first well plate containing the first reagent solution.

5. The sample pretreatment device according to claim 1, wherein the controller is programmed to carry out a mixing-promoting operation by performing suction and ejection of a liquid in each well of the other first well plate when dispensing the mixed solutions into the wells of the other first well plate containing the second reagent solution.

6. The sample pretreatment device according to claim 1, wherein N and M is equal to 8 and 12, respectively, or 16 and 24, respectively.

* * * * *